US011002849B2

(12) United States Patent
Mukai et al.

(10) Patent No.: US 11,002,849 B2
(45) Date of Patent: May 11, 2021

(54) DRIVING LANE DETECTION DEVICE AND DRIVING LANE DETECTION METHOD (71) Applicant: Panasonic Intellectual Property Management Co., Ltd., Osaka (JP)

(72) Inventors: Hirohito Mukai, Kanagawa (JP); Tomohiro Yui, Kanagawa (JP); Yoshinao Kawai, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 217 days.

(21) Appl. No.: 16/351,261

(22) Filed: Mar. 12, 2019

(65) Prior Publication Data

US 2019/0212440 A1 Jul. 11, 2019

Related U.S. Application Data (63) Continuation of application No. 15/017,543, filed on Feb. 5, 2016, now Pat. No. 10,310,076.

(30) Foreign Application Priority Data

Feb. 16, 2015 (JP) ................................ 2015-027500

(51) Int. Cl.
*G01S 13/931* (2020.01)
*G06K 9/00* (2006.01)
*G01S 13/86* (2006.01)

(52) U.S. Cl.
CPC ............ *G01S 13/931* (2013.01); *G01S 13/86* (2013.01); *G06K 9/00798* (2013.01);
(Continued)

(58) Field of Classification Search
CPC .. G01S 13/931; G01S 13/86; G01S 2013/932; G01S 2013/9316;
(Continued)

(56) References Cited

U.S. PATENT DOCUMENTS 3,772,694 A 11/1973 Sato et al.
5,694,130 A * 12/1997 Suzuki ................. G01S 13/931
342/70
(Continued)

FOREIGN PATENT DOCUMENTS

CN 104029676 A 9/2014
JP 2002-022828 A 1/2002
(Continued)

OTHER PUBLICATIONS

Sivaraman et al., "Integrated Lane and Vehicle Detection, Localization, and Tracking : A synergistic Approach", IEEE Transactions on Intelligent Transportation Systems, vol. 14, No. 2, Jun. 2013, pp. 906-917 (Year: 2013).*

(Continued)

*Primary Examiner* — Frank J McGue
(74) *Attorney, Agent, or Firm* — Seed IP Law Group LLP (57) ABSTRACT A driving lane detection device of the present disclosure includes: an object detector, a vehicle detector, and a driving lane detector. The object detector generates object data relating to a distance and direction from the vehicle to an object and a movement direction of the object based on one or more reflection waves that are a radar signal transmitted by a radar device and reflected by the one or more object. The vehicle detector detects each object as at least one of a parallel-running vehicle running in a same direction as the vehicle or an oncoming vehicle running in an opposite direction to the vehicle, based on the object data. The driving lane detector detects a driving lane based on the distance and direction from the vehicle to at least one of the detected parallel-running and the detected oncoming vehicles and lane information on at least one of lane widths and a number of lanes of a road on which the vehicle is running.

8 Claims, 7 Drawing Sheets

(52) U.S. Cl.
CPC .... *G06K 9/00805* (2013.01); *G01S 2013/932* (2020.01); *G01S 2013/9316* (2020.01); *G01S 2013/9322* (2020.01); *G01S 2013/93271* (2020.01); *G01S 2013/93274* (2020.01)

(58) Field of Classification Search
CPC ... G01S 2013/9322; G01S 2013/93271; G01S 2013/93274; G06K 9/00798; G06K 9/00805; B60W 40/06; B60W 2555/00; B60W 2556/50
USPC .......................................................... 342/70
See application file for complete search history.

(56) References Cited

U.S. PATENT DOCUMENTS

| | | | |
|---|---|---|---|
| 6,026,347 | A | 2/2000 | Schuster |
| 6,292,725 | B1 * | 9/2001 | Kageyama ............... G08G 1/20 701/23 |
| 2007/0221822 | A1 | 9/2007 | Stein et al. |
| 2011/0118900 | A1 | 5/2011 | Uchida et al. |
| 2013/0257643 | A1 | 10/2013 | Inomata et al. |
| 2014/0257686 | A1 | 9/2014 | Feldman et al. |
| 2016/0039411 | A1 | 2/2016 | Park et al. |

FOREIGN PATENT DOCUMENTS

| | | |
|---|---|---|
| JP | 2002-225657 A | 8/2002 |
| JP | 2003-044978 A | 2/2003 |
| JP | 2005-257314 A | 9/2005 |
| JP | 2010-038706 A | 2/2010 |

OTHER PUBLICATIONS

English Translation of Chinese Search Report dated Mar. 29, 2019 for the related Chinese Patent Application No. 201510957254.7.
Sivaraman et al., "Integrated Lane and Vehicle Detection, Localization, and Tracking: A Synergistic Approach," *IEEE Transactions on Intelligent Transportation Systems*, 14(2), Jun. 2013, 12 pages.

* cited by examiner

FIG. 4A
FIFTH SCENE

DRIVING LANE DETECTION DEVICE AND DRIVING LANE DETECTION METHOD

BACKGROUND

1. Technical Field

The present disclosure relates to a driving lane detection device mounted in a vehicle and a driving lane detection method for specifying a lane on which a host vehicle is running.

2. Description of the Related Art

For example, for the purpose of autonomous driving of a vehicle such as an automobile, it is desired that a lane (a driving lane) on which a host vehicle is currently running be accurately detected on a road having a plurality of lanes (traffic lanes) of the same direction.

Conventionally, there is a technique for detecting a driving lane of a host vehicle by specifying the position of the host vehicle by using the GPS (Global Positioning System) or the like and then superimposing the specified position on map data or the like.

However, positioning using the GPS generally has an error of several meters to several tens of meters. Accordingly, the road on which the host vehicle is running can be specified by superimposing the position of the host vehicle on the map data, but it is difficult to accurately detect the driving lane of the host vehicle.

SUMMARY

One non-limiting and exemplary embodiment provides a driving lane detection device that can accurately detect a driving lane of a host vehicle.

In one general aspect, the techniques disclosed here feature a driving lane detection device mountable in a vehicle, including an object detector that generates object data that is information relating to a distance from the vehicle to each of one or more objects, a direction from the vehicle to each of the one or more objects, and a movement direction of each of the one or more objects, based on one or more reflection waves that are a radar signal transmitted by a radar device and reflected by the one or more objects; a vehicle detector that detects each of the one or more objects as at least one of a parallel-running vehicle or an oncoming vehicle, based on the generated object data, is the parallel-running vehicle being another vehicle that is running on a lane in a same direction as the vehicle and the oncoming vehicle being another vehicle that is running on a lane in an opposite direction to the vehicle; and a driving lane detector that detects a driving lane of the vehicle based on the distance from the vehicle to at least one of the detected parallel-running vehicle and the detected oncoming vehicle, the direction from the vehicle to at least one of the detected parallel-running vehicle and the detected oncoming vehicle, and lane information relating to at least one of lane widths and a number of lanes of a road on which the vehicle is running.

According to the present disclosure, it is possible to accurately detect a driving lane of a host vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

First, underlying knowledge forming the basis of the present disclosure is described below.

For example, the technique disclosed in Japanese Unexamined Patent Application Publication No. 2002-225657 is a conventional technique that makes it possible to detect a driving lane of a host vehicle even on a road with no lane mark or the like, such as a white line or a raised marker, which is a boundary between lanes.

The driving lane detection system disclosed in Japanese Unexamined Patent Application Publication No. 2002-225657 detects a driving lane of a host vehicle by measuring a distance between the host vehicle and a side object (e.g., a sidewall) by using a radar device provided on both sides of the vehicle and acquiring the number of lanes, the width of a lane, and the width of a road shoulder from a database.

However, according to the technique disclosed in Japanese Unexamined Patent Application Publication No. 2002-225657, it is difficult to detect the driving lane in a case where no sidewall exists on both the right and the left of the host vehicle. Furthermore, even in a case where a sidewall exists, it is difficult to accurately detect the driving lane of the host vehicle in a case where an obstacle such as a parked vehicle exists between the host vehicle and the sidewall.

The present disclosure provides a technique for detecting a driving lane of a host vehicle on the basis of a positional relationship between the host vehicle and other vehicles around the host vehicle by using a radar device as described in the following embodiment in order to accurately detect the driving lane of the host vehicle even in a case where there is no sidewall on the right and left of the host vehicle.

Embodiment

A driving lane detection device according to an embodiment of the present disclosure is described below.

Figure 1:
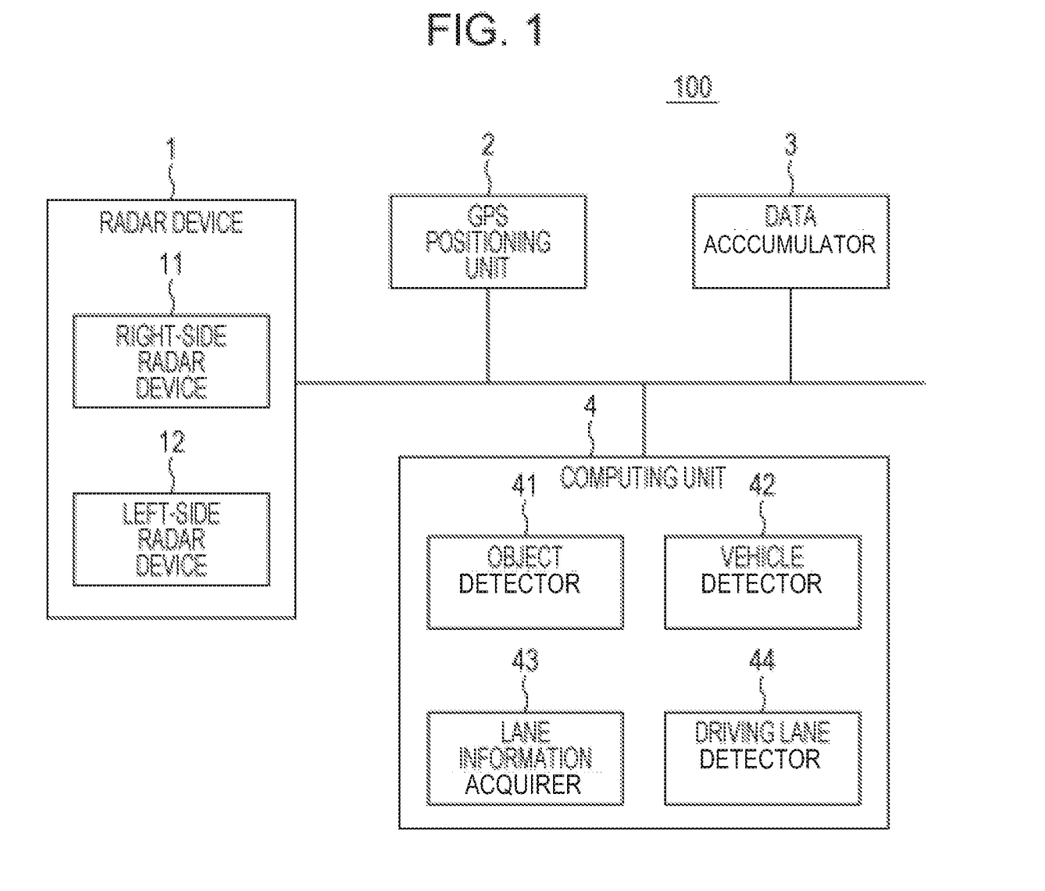
FIG. 1 is a diagram illustrating an example of a configuration of a driving lane detection device.

FIG. 1 is a diagram illustrating an example of a configuration of a driving lane detection device 100 according to an embodiment of the present disclosure. The driving lane detection device 100 is mounted in a vehicle and detects a lane on which the vehicle (host vehicle) is running in a case where the host vehicle is running on a road having a plurality of lanes. As illustrated in FIG. 1, the driving lane detection device 100 includes a radar device 1, a GPS positioning unit 2, a data accumulating unit 3, and a computing unit 4.

The radar device 1 transmits a radar signal and receives a radar reflection wave reflected by one or more objects around the vehicle.

The radar device 1 includes a right-side radar device 11 and a left-side radar device 12 so that a radar signal can be transmitted and received on both right and left sides of the vehicle. It is desirable that the right-side radar device 11 and the left-side radar device 12 be provided at positions closer to the front side than to the rear side on side faces of the vehicle so that a radar signal can be transmitted and received to and from especially regions diagonally in front of the vehicle. This arrangement is employed in order to accurately receive a radar reflection wave from another vehicle running on an opposite lane, i.e., an oncoming lane.

The GPS positioning unit 2 receives a radio wave from a plurality of GPS satellites overhead, measures the position of the host vehicle, and outputs position data of the host vehicle. A road on which the host vehicle is running is specified on the basis of the position data output by the GPS positioning unit 2 and map data stored in the data accumulating unit 3 that will be described later.

The data accumulating unit 3 accumulates therein map data and lane information in advance. The lane information is information, such as data concerning the number of lanes of each road (lane number data) and data concerning the width of each lane (lane width data), used in the driving lane detection device 100 of the present embodiment. The data accumulating unit 3 transfers necessary data in response to request from the computing unit 4 that will be described later. Furthermore, the data accumulating unit 3 accumulates therein the position data output by the GPS positioning unit 2, data generated by the computing unit 4, and the like or transfers the accumulated data again to the computing unit 4 in response to request from the computing unit 4 that will be described later.

The data accumulated in advance in the data accumulating unit 3 is not limited in particular in the present disclosure. Instead of accumulating all data in advance in the data accumulating unit 3, it is also possible to employ, for example, an arrangement in which the data accumulating unit 3 is connectable to any database on the Internet via a wireless communication line or the like, and acquires and updates necessary data as needed via the communication line.

The computing unit 4 detects the driving lane of the host vehicle by performing various kinds of computation on the basis of data acquired from the radar device 1, the GPS positioning unit 2, and the data accumulating unit 3. As illustrated in FIG. 1, the computing unit 4 includes an object detector 41, a vehicle detector 42, a lane information acquirer 43, and a driving lane detector 44. The processing for detecting the driving lane of the vehicle is performed by these elements.

Object Detector 41

The object detector 41 detects a distance and a direction from the host vehicle to one or more objects around the host vehicle (hereinafter simply referred to as an object) and a direction of the object on the basis of the measurement result of the radar device 1. Furthermore, the object detector 41 calculates a Doppler frequency (Doppler shift) from a difference between the frequency of a reflection wave reflected by the object and the frequency of the radar signal transmitted by the radar device 1 and then detects a movement speed, a movement direction, and the like of the object on the basis of the Doppler frequency. Then, the object detector 41 supplies object data including the distance and direction from the host vehicle to the object and the movement speed or the movement direction of the object thus detected to the vehicle detector 42.

Figure 2:
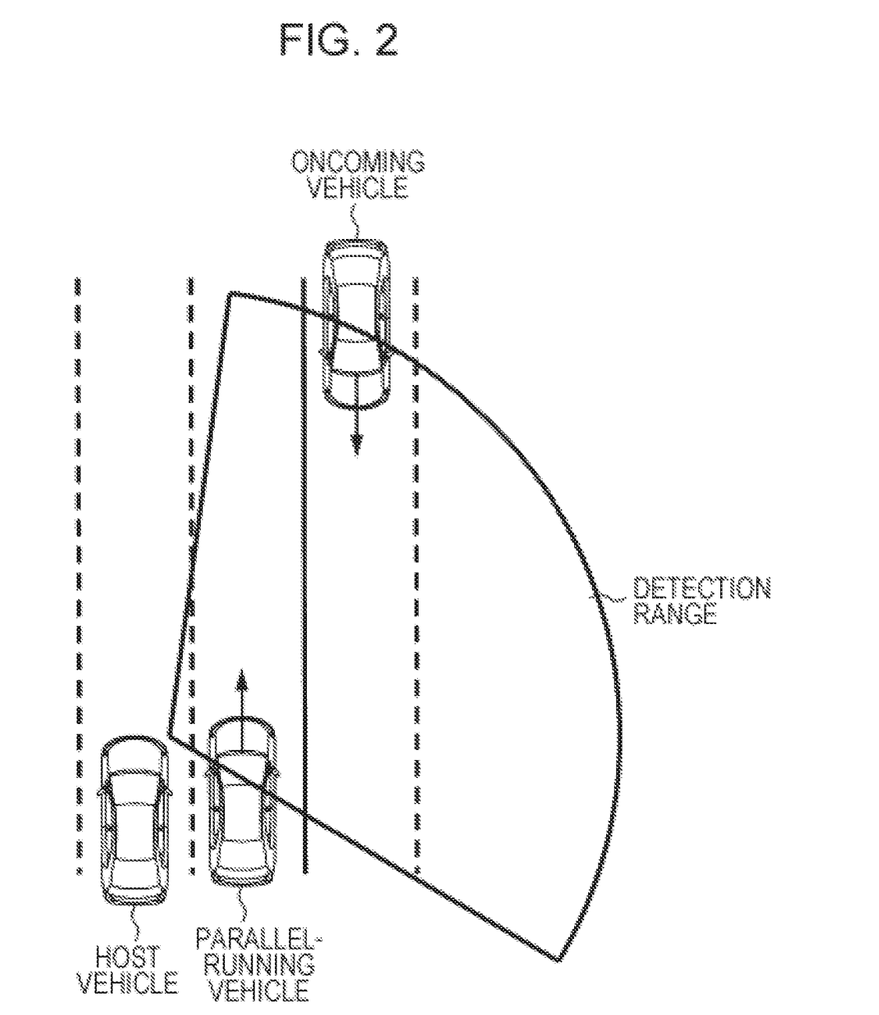
FIG. 2 is a diagram illustrating an object detection range of an object detector.

FIG. 2 is a diagram illustrating an object detection range of the object detector 41. As illustrated in FIG. 2, the detection range of the object detector 41 is a fan-like range that covers a region ranging from the front of the host vehicle to the sides of the host vehicle around the position of the radar device 1 in the host vehicle. Note that FIG. 2 illustrates a detection range of the right-side radar device 11, and a detection range of the left-side radar device 12 is not illustrated in FIG. 2. However, actually, the detection range of the left-side radar device 12 that is a range obtained by mirror-reversing the detection range of the right-side radar device 11 illustrated in FIG. 2 exists.

Vehicle Detector 42

The vehicle detector 42 detects a parallel-running vehicle and an oncoming vehicle on the basis of the object data supplied from the object detector 41. Then, the vehicle detector 42 generates parallel-running vehicle data including the distance and direction from the host vehicle to the parallel-running vehicle and oncoming vehicle data including the distance and direction from the host vehicle to the oncoming vehicle and then supplies the parallel-running vehicle data and the oncoming vehicle data to the driving lane detector 44. The parallel-running vehicle is a vehicle that is running on another lane in a direction same as that of the host vehicle, and the oncoming vehicle is a vehicle that is running on another lane in a direction opposite to that of the host vehicle.

Specifically, the vehicle detector 42 determines that an object that is moving in a direction almost the same as the host vehicle within the detection range of the object detector 41 illustrated in FIG. 2 is a parallel-running vehicle. The vehicle detector 42 determines that an object that is moving in a direction almost opposite to the host vehicle within the detection range of the object detector 41 is an oncoming vehicle.

Note that in some road situations around the host vehicle, at least one of a parallel-running vehicle and an oncoming vehicle does not exist, and it is difficult for the vehicle detector 42 to detect the parallel-running vehicle and the oncoming vehicle. In such cases, the vehicle detector 42 need just wait, for example, for a predetermined period T1 and then perform detection of a parallel-running vehicle and an oncoming vehicle again.

Lane Information Acquirer 43

The lane information acquirer 43 specifies a road on which the host vehicle is currently running on the basis of the position data output by the GPS positioning unit 2 and the map data stored in the data accumulator 3. Furthermore, the lane information acquirer 43 reads out data concerning the specified road on which the host vehicle is currently running from the data accumulator 3 and then supplies the data thus read out to the driving lane detector 44. The data concerning the specified road on which the host vehicle is currently running is, for example, lane information including at least one of the data concerning the number of lanes (the lane number data) and the data concerning the width of each lane (the lane width data).

Driving Lane Detector 44

The driving lane detector 44 specifies a lane on which the host vehicle is running on the basis of the parallel-running vehicle data and the oncoming vehicle data output by the vehicle detector 42 and the lane information output by the lane information acquirer 43.

Figure 3A:
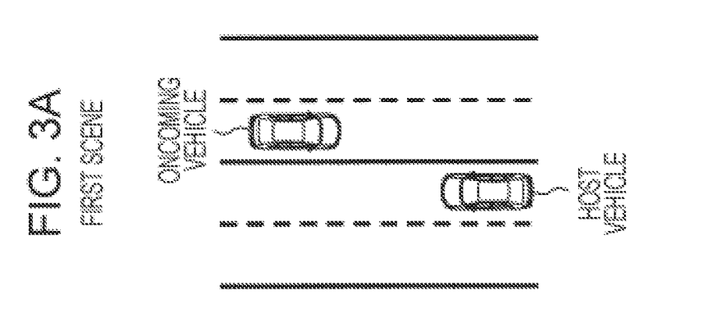
FIG. 3A is a diagram for explaining an example of an assumed scene in which the driving lane detector detects a driving lane of a host vehicle on a road having two lanes on each side.
Figure 3B:
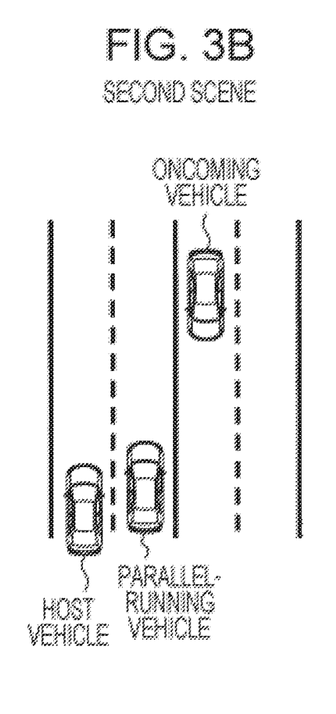
FIG. 3B is a diagram for explaining another example of an assumed scene in which the driving lane detector detects a driving lane of a host vehicle on a road having two lanes on each side.
Figure 3C:
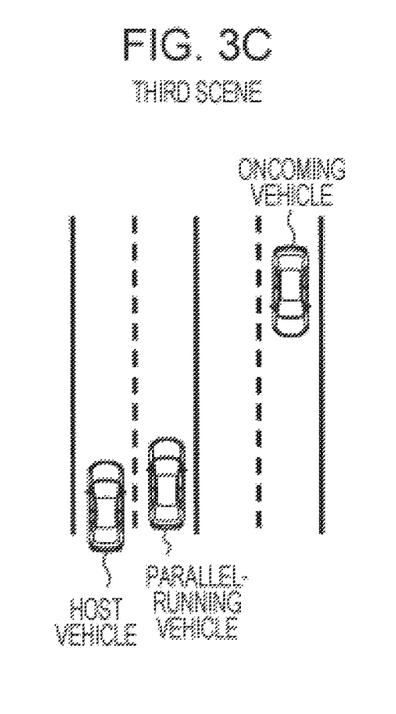
FIG. 3C is a diagram for explaining another example of an assumed scene in which the driving lane detector detects a driving lane of a host vehicle on a road having two lanes on each side.
Figure 3D:
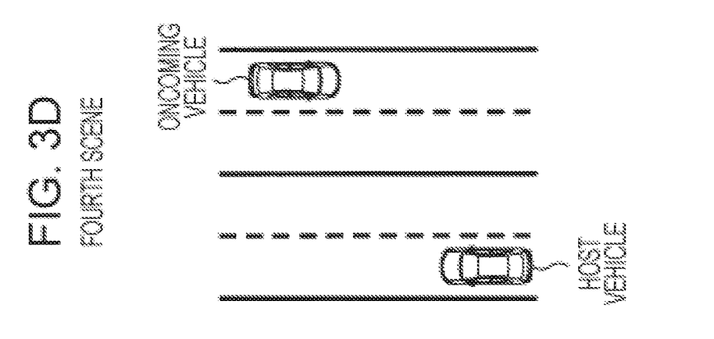
FIG. 3D is a diagram for explaining another example of an assumed scene in which the driving lane detector detects a driving lane of a host vehicle on a road having two lanes on each side.
Figure 4A:
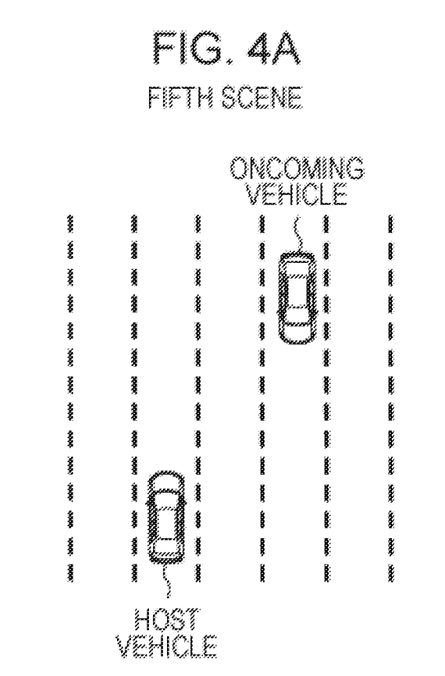
FIG. 4A is a diagram for explaining an example of an assumed scene in which the driving lane detector detects a driving lane of a host vehicle on a road having two lanes on each side.
Figure 4B:
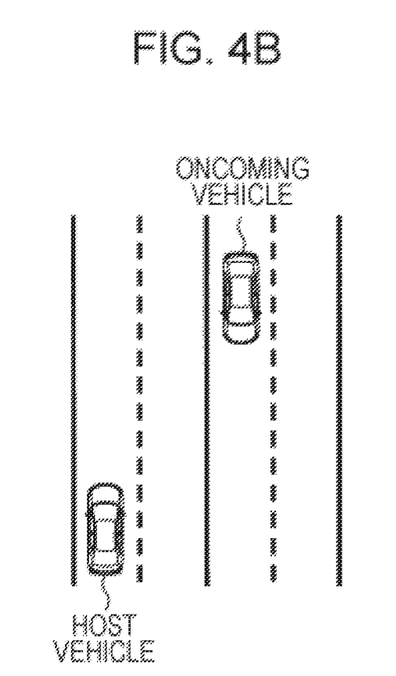
FIG. 4B is a diagram for explaining another example of an assumed scene in which the driving lane detector detects a driving lane of a host vehicle on a road having two lanes on each side.
Figure 4C:
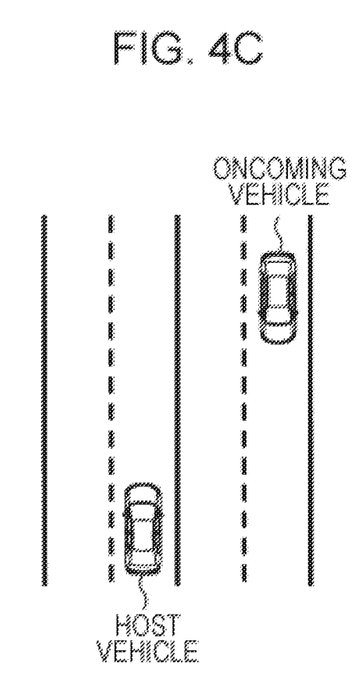
FIG. 4C is a diagram for explaining another example of an assumed scene in which the driving lane detector detects a driving lane of a host vehicle on a road having two lanes on each side.

FIGS. 3A through 3D and FIGS. 4A through 4C are diagrams for explaining assumed scenes in which the driving lane detector 44 detects a driving lane of a host vehicle on a road having two lanes on each side. FIGS. 3A through 3D illustrate scenes in which the driving lane of the host vehicle can be uniquely detected, and FIGS. 4A through 4C illustrate scenes in which it is difficult to uniquely specify the driving lane.

FIG. 3A illustrates a first scene in which the host vehicle and an oncoming vehicle are running on adjacent lanes. In the first scene, the driving lane detector 44 determines that an object exists on an adjacent lane on the basis of the distance and direction from the host vehicle to the object, and determines that the object is an oncoming vehicle on the basis of the movement direction of the object. In the case where the host vehicle and the oncoming vehicle are running on the adjacent lanes on a road having two lanes on each side, the lanes on which the host vehicle and the oncoming vehicle are running are uniquely determined, and therefore the driving lane detector 44 can detect the driving lane of the host vehicle.

FIG. 3B illustrates a second scene in which a parallel-running vehicle is running on a lane adjacent to the host vehicle and an oncoming vehicle is running on a lane adjacent to the parallel-running vehicle. In the second scene, the driving lane detector 44 determines that an object exists on the adjacent lane and the lane adjacent to the adjacent lane on the basis of the distances and directions from the host vehicle to the objects included in the object data and the lane width data. Furthermore, the driving lane detector 44 determines that the object that is running on the adjacent lane is a parallel-running vehicle and that the object that is running on the lane adjacent to the adjacent lane is an oncoming vehicle on the basis of the movement directions of the objects. In the second scene, the lane on which the host vehicle is running is uniquely determined since the host vehicle and the parallel-running vehicle exist and it can be determined that the road is a road having two lanes on each side on the basis of the lane number data. In this way, the driving lane detector 44 can detect the driving lane of the host vehicle.

FIG. 3C illustrates a third scene in which a parallel-running vehicle is running on a lane adjacent to the host vehicle and an oncoming vehicle is running two lanes away from the lane on which the parallel-running vehicle is running. In the third scene, the driving lane detector 44 determines that an object exists on the adjacent lane and the lane that is two lanes away from the adjacent lane on the basis of the distances and directions from the host vehicle to the objects and the lane width data. Furthermore, the driving lane detector 44 determines that the object that is running on the adjacent lane is a parallel-running vehicle and that the object that is running two lanes away from the adjacent lane is an oncoming vehicle on the basis of the movement directions of the objects. In the third scene, the lane on which the host vehicle is running is uniquely determined since the host vehicle and the parallel-running vehicle exist and it is determined that the road is a road having two lanes on each side on the basis of the lane number data as in the second scene. In this way, the driving lane detector 44 can detect the driving lane of the host vehicle.

FIG. 3D illustrates a fourth scene in which an oncoming vehicle is running three lanes away from the host vehicle. In the fourth lane, the vehicle detector 42 determines that an object exists three lanes away from the host vehicle on the basis of the distance and direction from the host vehicle to the object and the lane width data. Furthermore, the driving lane detector 44 determines that the object that is running three lanes away from the host vehicle is an oncoming vehicle on the basis of the movement direction of the object. In this case, since it has been determined that the road is a road having two lanes on each side on the basis of the lane number data, the driving lane detector 44 can determine that the host vehicle and the oncoming vehicle are running on outer lanes. In this way, the driving lane detector 44 can detect the driving lane of the host vehicle.

Next, FIG. 4A illustrates a fifth scene in which an oncoming vehicle is running two lanes away from the host vehicle and no parallel-running vehicle and no other oncoming vehicle exist. In the fifth scene, the driving lane detector 44 determines that an object exists two lanes away from the host vehicle on the basis of the distance and direction from the host vehicle to the object and the lane width data. Furthermore, the driving lane detector 44 determines that the object that is running two lanes away from the host vehicle is an oncoming vehicle on the basis of the movement direction of the object.

However, the fifth scene encompasses two cases, i.e., a case where the host vehicle is running on an outer lane and the oncoming vehicle is running on an inner oncoming lane as illustrated in FIG. 4B and a case where the host vehicle is running on an inner lane and the oncoming vehicle is running on an outer oncoming lane as illustrated in FIG. 4C. Therefore, in the fifth scene, it is difficult for the driving lane detector 44 to specify the driving lane of the host vehicle.

In such a case, the driving lane detector 44 need just acquire parallel-running vehicle data and oncoming vehicle data after a change of a surrounding situation resulting from passage of time after waiting, for example, for a predetermined period T2, and then perform detection of the driving lane again.

FIGS. 3A through 3D and FIGS. 4A through 4C illustrate scenes assumed in a case in which the driving lane of the host vehicle is to be detected on a road having two lanes on each side. However, the present embodiment is not limited to these scenes. Even in a case where the host vehicle is running on a road having more lanes, the driving lane detector 44 can detect a driving lane in a manner similar to that in the case of a road having two lanes on each side described above.

The assumed scenes used in a case where the driving lane detector 44 detects the driving lane of the host vehicle can be assumed in advance, for example, on the basis of a positional relationship among the host vehicle, a parallel-running vehicle, and an oncoming vehicle and the number of lanes on the road. It is therefore only necessary that all scenes that can occur be assumed in advance on the basis of a positional relationship among the host vehicle, a parallel-running vehicle, and an oncoming vehicle and the number of lanes on the road and be accumulated in the data accumulator 3 or the like. In actual detection of the driving lane of the host vehicle, the driving lane detector 44 need just inquire a corresponding scene from the data accumulator 3 and detects a driving lane corresponding to the scene.

Example of Operation of Driving Lane Detection Device 100

Figure 5:
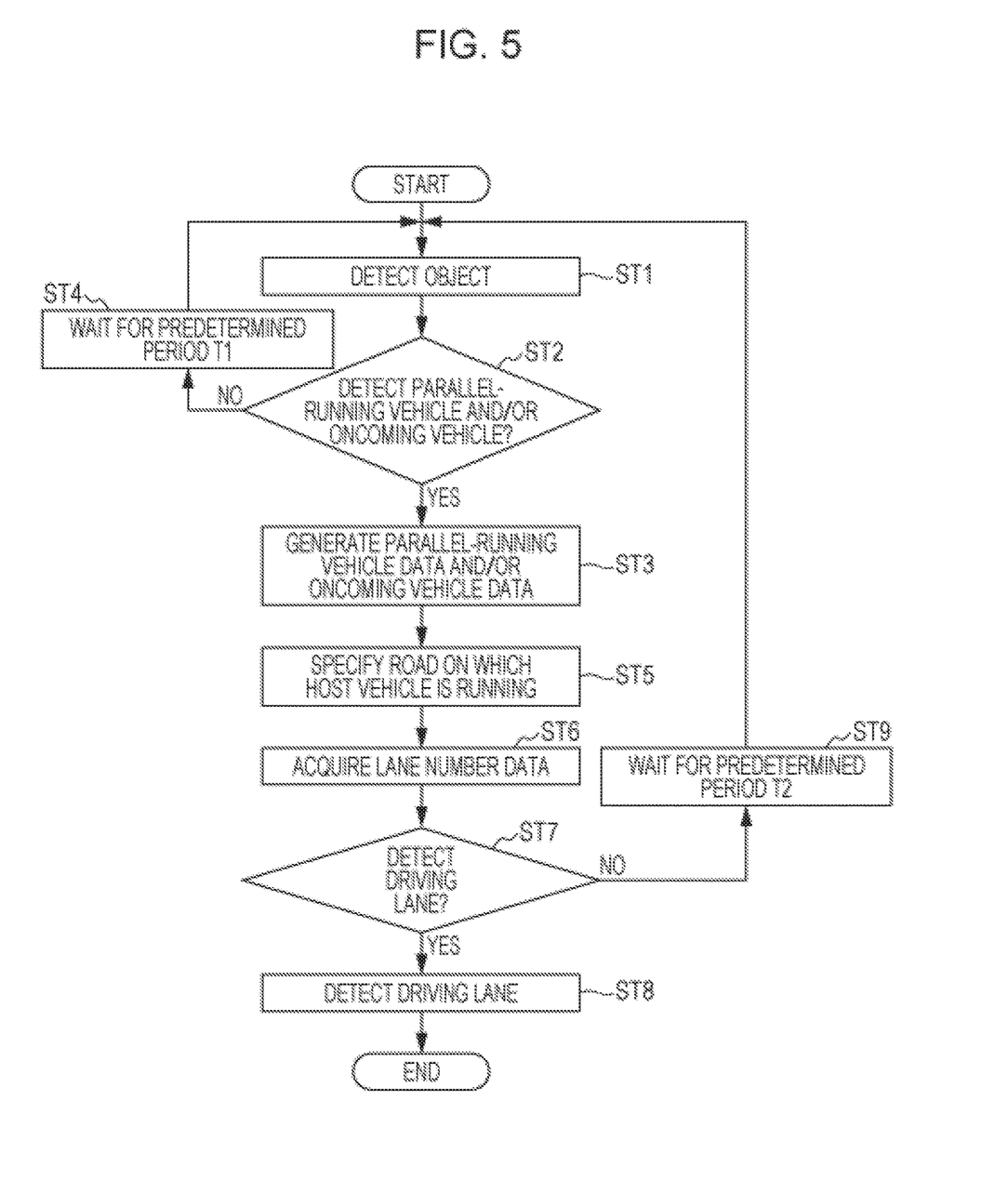
FIG. 5 is a diagram illustrating an example of details of operation of the driving lane detection device.

An example of details of operation of the driving lane detection device 100 according to the present embodiment is described below with reference to the flow chart of FIG. 5.

Step ST1

The object detector 41 detects one or more objects around the host vehicle on the basis of a radar reflection wave received by the radar device 1 and then generate object data including a distance and a direction from the host vehicle to each object and a movement direction of each object.

Step ST2

The vehicle detector 42 detects a parallel-running vehicle and/or an oncoming vehicle on the basis of the object data. In a case where a parallel-running vehicle and/or an oncoming vehicle is detected (YES), the processing proceeds to Step ST3. In a case where neither a parallel-running vehicle nor an oncoming vehicle is detected (NO), the processing proceeds to Step ST4.

Step ST3

The vehicle detector 42 generates parallel-running vehicle data concerning the detected parallel-running vehicle and/or oncoming vehicle data concerning the detected oncoming vehicle and then supplies the parallel-running vehicle data and/or the oncoming vehicle data to the driving lane detector 44.

Step ST4

The vehicle detector 42 returns to Step ST1 after waiting for the predetermined period T1.

Step ST5

The lane information acquirer 43 specifies a road on which the host vehicle is currently running on the basis of the position data output by the GPS positioning unit 2 and map data stored in the data accumulator 3.

Step ST6

The lane information acquirer 43 acquires lane number data concerning the number of lanes of the road specified in Step ST5 from the data accumulator 3 and then supplies the lane number data to the driving lane detector 44.

Step ST7

The driving lane detector 44 determines whether or not the driving lane of the host vehicle can be specified on the basis of the parallel-running vehicle data and/or the oncoming vehicle data output by the vehicle detector 42 in Step ST3 and the lane number data output by the lane information acquirer 43 in Step ST6. In a case where the driving lane of the host vehicle can be specified (YES), the processing proceeds to Step ST8. In a case where the driving lane of the host vehicle cannot be specified (NO), the processing proceeds to Step ST9.

Step ST8

The driving lane detector 44 generates driving lane data indicative of the specified driving lane of the host vehicle and then outputs the driving lane data.

Step ST9

The driving lane detector 44 returns to Step ST1 after waiting for the predetermined period T2.

Note that the predetermined period T1 in Step St4 and the predetermined period T2 in Step ST9 may be any periods, and lengths thereof are not limited in the present embodiment. The predetermined period T1 and the predetermined period T2 may be the same as each other or may be different from each other. Note, however, that if the predetermined period T1 and the predetermined period T2 are too long, the accuracy of detection of the driving lane decreases. In view of this, preferable values need just be experimentally found.

As described above, in the driving lane detection device 100 according to the present embodiment, the object detector 41 generates object data which is information on a distance and a direction from the host vehicle to one or more objects around the vehicle and a movement direction of the one or more objects on the basis of a reflection wave received by the radar device 1. Then, the vehicle detector 42 detects an object that is moving in a direction almost the same as the host vehicle as a parallel-running vehicle and detects an object that is moving in a direction almost opposite to the host vehicle as an oncoming vehicle on the basis of the generated object data. The driving lane detector 44 detects the driving lane of the vehicle on the basis of the distance and direction from the host vehicle to at least one of the parallel-running vehicle and the oncoming vehicle detected by the vehicle detector 42 and lane information, which is information concerning lanes of a road on which the vehicle is running, accumulated in the data accumulator 3. According to the driving lane detection device 100 according to the present embodiment, it is therefore possible to accurately detect the driving lane of the host vehicle and to detect the driving lane of the host vehicle even in a case where no sidewall exists on a road on which the host vehicle is running or in a case where an obstacle such as a parked vehicle exists.

Furthermore, according to the driving lane detection device 100 of the present embodiment, the lane information acquirer 43 specifies a road on which the host vehicle is running on the basis of position data of the vehicle generated by the GPS positioning unit 2 and map data accumulated in the data accumulator 3. Then, the lane information acquirer 43 reads out lane number data of the specified road from the data accumulator 3 and then supplies the lane number data to the driving lane detector 44. Since the driving lane can be detected in accordance with the position of the host vehicle, it is possible to improve the accuracy of detection of the driving lane.

Furthermore, according to the driving lane detection device 100 of the present embodiment, the driving lane detector 44 performs detection of the driving lane of the host vehicle again after waiting for the predetermined period T2 in a case where the driving lane detector 44 failed to detect the driving lane of the host vehicle on the basis of the distances and directions from the host vehicle to the parallel-running vehicle and the oncoming vehicle, the lane number data, and the lane width data. That is, even in a case where the driving lane of the host vehicle cannot be detected depending on a positional relationship among the host vehicle, the parallel-running vehicle, and the oncoming vehicle, the driving lane detector 44 can wait until a situation in which the driving lane of the host vehicle can be detected is obtained.

The driving lane detection device 100 according to the embodiment described above is merely one embodiment of the present disclosure, and the present disclosure is not limited to the above embodiment. Modifications of the driving lane detection device according to the embodiment of the present disclosure described above are described below.

Modification 1

Figure 6:
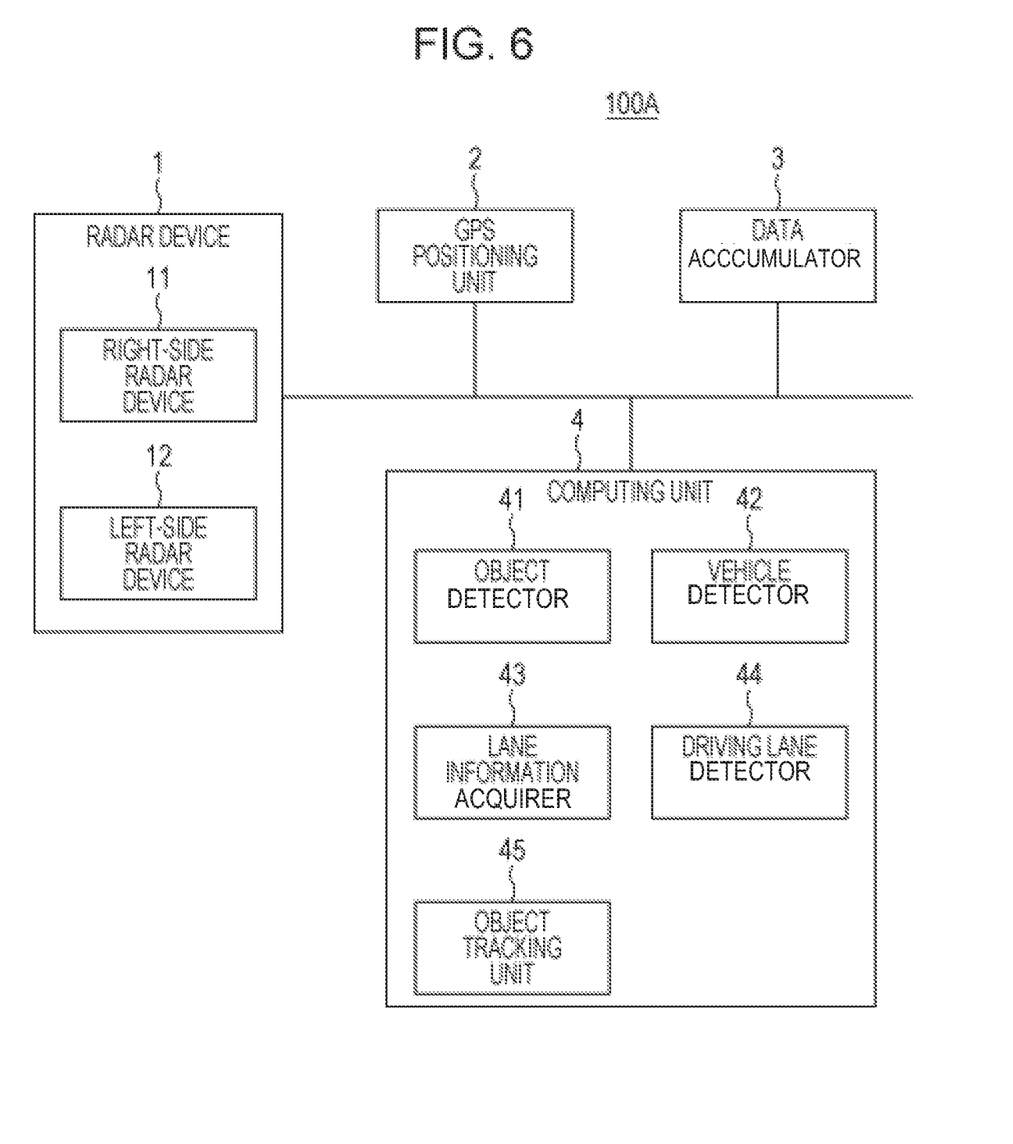
FIG. 6 is a diagram illustrating a configuration of a driving lane detection device according to Modification 1.

Modification 1 is different from the above embodiment in that a computing unit 4 further includes an object tracking unit 45. FIG. 6 is a diagram illustrating a configuration of a driving lane detection device 100A according to Modification 1. As illustrated in FIG. 6, the configuration of the driving lane detection device 100A according to Modification 1 is similar to that of the driving lane detection device 100 according to the above embodiment except for the object tracking unit 45. The following describes the object tracking unit 45 and operations that differ from the above embodiment as a result of addition of the object tracking unit 45.

Object Tracking Unit 45

The object tracking unit 45 generates tracking data by continuously collecting object data obtained as a result of detection by an object detector 41. Then, the object tracking unit 45 accumulates the generated tracking data in a data accumulator 3. Note that the tracking data may include position data of the host vehicle output by a GPS positioning unit 2, data concerning the number of lanes of a road on which the host vehicle is running that is acquired by a lane information acquirer 43 that will be described later, or driving lane data generated by a driving lane detector 44 in addition to object data of one or more objects around the host vehicle generated by the object detector 41. The tracking data is, for example, time-series data in which each object data is associated with a detection time.

The object tracking unit 45 reads out, from the data accumulator 3, continuously collected tracking data which is a set of object data of one or more objects around the host vehicle as needed. A situation in which the tracking data is needed is, for example, a case where the driving lane detector 44 failed to specify the driving lane of the host vehicle on the basis of the positional relationship among the host vehicle, the parallel-running vehicle, and the oncoming vehicle and lane number data.

That is, in Modification 1, in a case where the driving lane detector 44 failed to specify the driving lane of the host vehicle, the object tracking unit 45 reads out tracking data generated during, for example, the predetermined period T2 from the data accumulator 3 after elapse of the predetermined period T2. Since the tracking data includes object data of the object around the host vehicle during the predetermined period T2 as described above, it is expected that the situation around the host vehicle has changed to a situation in which the driving lane detector 44 can detect the driving lane of the host vehicle.

Alternatively, the object tracking unit 45 may always monitor object data and start processing of the driving lane detection device 100A when the situation changes from a situation in which the driving lane detector 44 cannot detect the driving lane to a situation in which the driving lane detector 44 can detect the driving lane. For example, the fifth scene illustrated in FIG. 4 is a situation in which the driving lane cannot be detected. However, for example, if a parallel-running vehicle newly appears, another oncoming vehicle appears, or the oncoming vehicle switches lanes in the fifth scene illustrated in FIG. 4, the driving lane of the host vehicle can be uniquely determined. The object tracking unit 45 may monitor whether or not the situation has changed and notify the driving lane detector 44 in a case where the situation has changed.

As described above, according to the driving lane detection device 100A of Modification 1, the object tracking unit 45 generates tracking data of an object around the host vehicle, and the driving lane of the host vehicle can be accurately detected by referring to the tracking data in a case where the driving lane cannot be detected.

Modification 2

Figure 7:
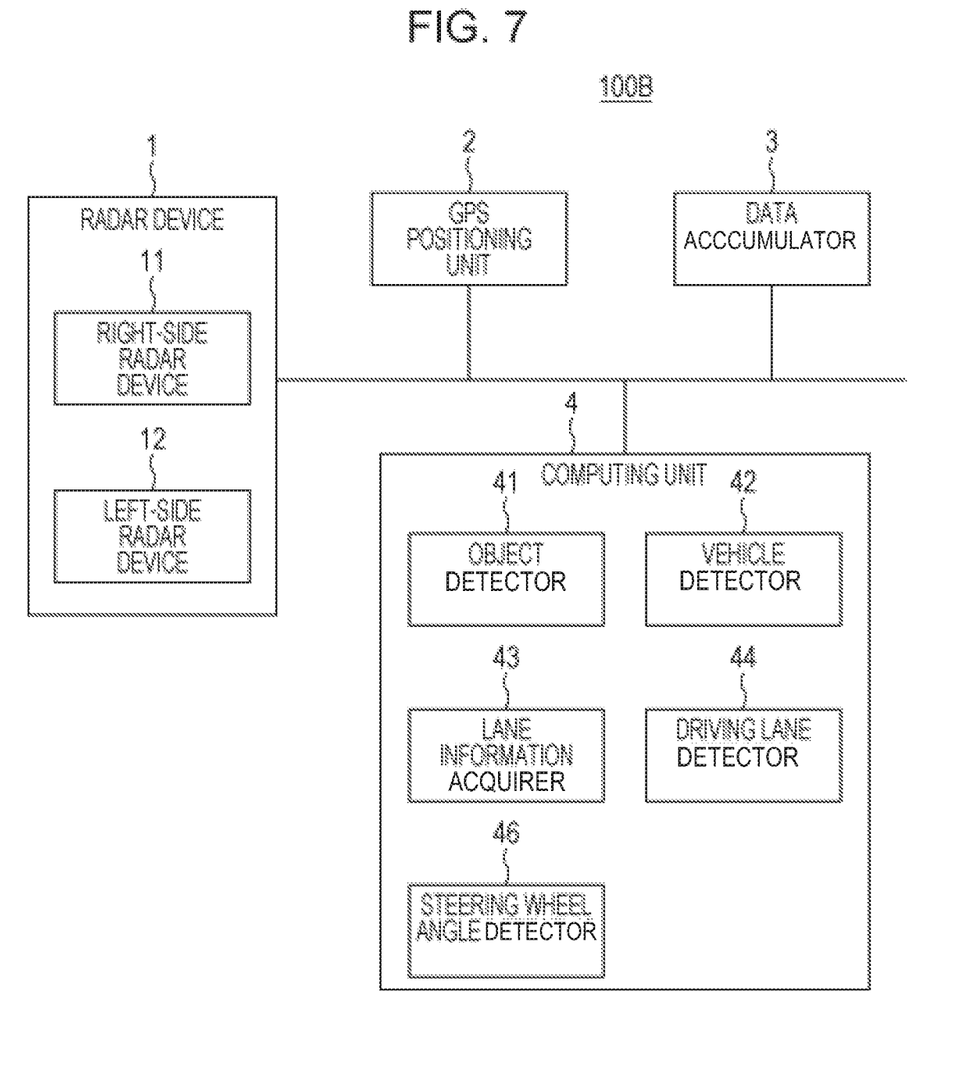
FIG. 7 is a diagram illustrating a configuration of a driving lane detection device according to Modification 2.

Modification 2 is different from the above embodiment in that a computing unit 4 further includes a steering wheel angle detector 46. FIG. 7 is a diagram illustrating a configuration of a driving lane detection device 1006 according to Modification 2. As illustrated in FIG. 7, the configuration of the driving lane detection device 100B according to Modification 2 is similar to that of the driving lane detection device 100 according to the above embodiment except for the steering wheel angle detector 46. The following describes the steering wheel angle detector 46 and operations that differ from the above embodiment as a result of addition of the steering wheel angle detector 46.

Steering Wheel Angle Detector 46

The steering wheel angle detector 46 detects a steering angle of a steering wheel of a host vehicle. The steering wheel angle detector 46 detects steering of a predetermined angle or larger and determines that the host vehicle has switched lanes in a case where, after detection of steering, the host vehicle is running in a direction almost same as a running direction before detection of steering. Note that in a case where it can be determined that the road is curved on the basis of map information, the steering wheel angle detector 46 determines that the host vehicle has switched lanes in a case where a steering angle equal to or larger than an angle that varies depending on the curvature of the curve is detected.

In Modification 2, in a case where the steering wheel angle detector 46 determines that the host vehicle has switched lanes during the predetermined period T2 after the driving lane detector 44 failed to specify the driving lane of the host vehicle on the basis of the positional relationship among the host vehicle, a parallel-running vehicle, and an oncoming vehicle and lane number data, the steering wheel angle detector 46 notifies the driving lane detector 44 of switching of lanes. This is because it can be expected that the situation has changed to a situation in which the driving lane detector 44 can detect the driving lane of the host vehicle as a result of switching of lanes of the host vehicle. Then, the driving lane detector 44 performs detection again in response to the notification.

As described above, according to the driving lane detection device 100B according to Modification 2, the steering wheel angle detector 46 can detect the presence of absence of lane switching of the host vehicle, and it is therefore possible to accurately detect the driving lane of the host vehicle.

Modification 3

In Modification 3, a lane information acquirer 43 specifies a road on which a host vehicle is running on the basis of position data output by a GPS positioning unit 2 and map data accumulated in a data accumulator 3. When the GPS positioning unit 2 reads out data concerning the road from the data accumulator 3, the GPS positioning unit 2 reads out median strip data together with lane number data and lane width data. The median strip data is data indicating whether or not the road has a median strip and need just be accumulated in advance in the data accumulator 3.

In a case where the median strip data thus acquired indicates that the road on which the host vehicle is running has a median strip, the lane information acquirer 43 notifies a vehicle detector 42 of the presence of a median strip.

In a case where a median strip exists, it is assumed that a radar transmission signal from a radar device 1 does not reach an oncoming lane due to the median strip. Therefore, the vehicle detector 42 that has received the notification indicating the presence of a median strip on the road on which the host vehicle is running does not perform detection of an oncoming vehicle but performs detection of a parallel-running vehicle, and then outputs parallel-running vehicle data. Then, the driving lane detector 44 performs detection of the driving lane of the host vehicle on the basis of the parallel-running vehicle data without considering an oncoming vehicle.

As described above, according to Modification 3, it is possible to accurately detect the driving lane of the host vehicle even in a case where a median strip exists and it is difficult to detect data concerning an oncoming vehicle.

The present disclosure is applicable to a radar device that accurately detects a lane on which a host vehicle is currently running.

What is claimed is:

1. A driving lane detection device mountable in a vehicle, the driving lane detection device comprising:
    an object detector, which, in operation, generates object data that includes information relating to a distance from the vehicle to each of one or more objects, a direction from the vehicle to each of the one or more objects, and a movement direction of each of the one or more objects, based on one or more reflection waves that are a radar signal transmitted by a radar device and reflected by the one or more objects;
    a vehicle detector, which, in operation, detects at least one of a parallel-running vehicle or an oncoming vehicle based on the generated object data, the parallel-running vehicle being another vehicle that is running on a lane in a same direction as the vehicle, and the oncoming vehicle being another vehicle that is running on a lane in an opposite direction to the vehicle;
    a lane information acquirer, which, in operation, specifies a road on which the vehicle is running based on position data generated by a GPS positioning unit of the vehicle and map data accumulated in a data accumulator, and reads out lane information corresponding to the specified road from the data accumulator;
    a driving lane detector, which, in operation, detects a driving lane of the vehicle based on a distance from the vehicle to at least one of the detected parallel-running vehicle or the detected oncoming vehicle, a direction from the vehicle to at least one of the detected parallel-running vehicle or the detected oncoming vehicle, and the lane information; and
    a steering wheel angle detector, which, in operation, determines that the vehicle has switched lanes in a case where the road is curved on a basis of the map data, and a steering angle equal to or greater than an angle corresponding to a curvature of the road is detected, wherein
    the driving lane detector, in operation, detects the driving lane again after elapse of a predetermined period in a case where neither the parallel-running vehicle nor the oncoming vehicle has been detected, and
    the driving lane detector, in operation, further detects the driving lane again in response to the steering wheel angle detector determining that the vehicle has switched lanes during the predetermined period in the case where neither the parallel-running vehicle nor the oncoming vehicle has been detected.

2. The driving lane detection device according to claim 1, wherein
    the object detector, in operation, calculates a Doppler frequency based on a difference between a frequency of the one or more reflection waves and a frequency of the radar signal transmitted by the radar device, and detects the movement direction of each of the one or more objects based on the Doppler frequency, and
    the vehicle detector, in operation, determines that the one or more objects moving in a same direction as the vehicle is the parallel-running vehicle and that the one or more objects moving in an opposite direction as the vehicle is the oncoming vehicle.

3. A method for detecting a driving lane of a vehicle, the method comprising:
    receiving one or more reflection waves that are a radar signal transmitted by a radar device and reflected by one or more objects;
    generating object data that includes information relating to a distance from the vehicle to each of the one or more objects, a direction from the vehicle to each of the one or more objects, and a movement direction of each of the one or more objects based on the received one or more reflection waves;
    detecting at least one of a parallel-running vehicle or an oncoming vehicle, based on the generated object data, the parallel-running vehicle being another vehicle that is running on a lane in a same direction as the vehicle, and the oncoming vehicle being another vehicle that is running on a lane in an opposite direction to the vehicle;
    specifying a road on which the vehicle is running based on position data generated by a GPS positioning unit of the vehicle and map data accumulated in a data accumulator, and reading out lane information corresponding to the specified, road from the data accumulator;
    detecting a driving lane of the vehicle based on a distance from the vehicle to at least one of the detected parallel-running vehicle or the detected oncoming vehicle, a direction from the vehicle to at least one of the detected parallel-running vehicle or the detected oncoming vehicle, and the lane information; and
    determining that the vehicle has switched lanes in a case where the road is curved on a basis of the map data, and a steering angle equal to or greater than an angle corresponding to a curvature of the road is detected, wherein
    detecting the driving lane of the vehicle includes detecting the driving lane again after elapse of a predetermined period, in a case where neither the parallel-running vehicle nor the oncoming vehicle has been detected, and
    detecting the driving lane of the vehicle further includes detecting the driving lane again in response to determining that the vehicle has switched lanes during the predetermined period in the ease where neither the parallel-running vehicle nor the oncoming vehicle has been detected.

4. The method according to claim 3, wherein
the generating of the object data includes calculating a Doppler frequency based on a difference between a frequency of the received one or more reflection waves and a frequency of the radar signal transmitted by the radar device, and detecting the movement direction of each of the one or more objects based on the Doppler frequency, and
the detecting of the at least one of the parallel-running vehicle or the oncoming vehicle includes determining that the one or more objects moving in a same direction as the vehicle is the parallel-running vehicle and that the one or more objects moving in an opposite direction as the vehicle is the oncoming vehicle.

5. A driving lane detection device mountable in a vehicle, the driving lane detection device comprising:
an object detector, which, in operation, generates object data that includes information relating to a distance from the vehicle to each of one or more objects, a direction from the vehicle to each of the one or more objects, and a movement direction of each of the one or more objects, based on one or more reflection waves that are a radar signal transmitted by a radar device and reflected by the one or more objects;
a vehicle detector, which, in operation, detects at least one of a parallel-running vehicle or an oncoming vehicle based on the generated object data, the parallel-running vehicle being another vehicle that is running on a lane in a same direction as the vehicle, and the oncoming vehicle being another vehicle that is running on a lane in an opposite direction to the vehicle;
a lane information acquirer, which, in operation, specifies a road on which the vehicle is running based on position data generated by a GPS positioning unit of the vehicle and map data accumulated in a data accumulator, and reads out lane information corresponding to the specified road from the data accumulator; and
a driving lane detector, which, in operation, detects a driving lane of the vehicle based on a distance from the vehicle to at least one of the detected parallel-running vehicle or the detected oncoming vehicle, a direction from the vehicle to at least one of the detected parallel-running vehicle or the detected oncoming vehicle, and the lane information, wherein
the driving lane detector, in operation, detects, in response to determining that an object exists on an adjacent lane on a basis of the distance and direction from the vehicle to the object, and that the object is an oncoming vehicle on a basis of the movement direction of the object, that the driving lane of the vehicle is an innermost lane of a road having two lanes on each side,
the driving lane detector, in operation, detects, in response to determining that an object exists on an adjacent lane and another object exists on a lane adjacent to the adjacent lane on a basis of the distance and direction from the vehicle to the object and the distance and direction from the vehicle to the another object, and that the object that is running on the adjacent lane is a parallel-running vehicle and that the another object that is running on the lane adjacent to the adjacent lane is an oncoming vehicle on a basis of the movement direction of the object and the movement direction of the another object, that the driving lane of the vehicle is on an outermost lane of a road having two lanes on each side, and
the driving lane detector, in operation, detects, in response to determining that an object exists on an adjacent lane and another object exists on a lane that is two lanes away from the adjacent lane on a basis of the distance and direction from the vehicle to the object and the distance and direction from the vehicle to the another object, and that the object that is running on the adjacent lane is a parallel-running vehicle and that the another object that is running two lanes away from the adjacent lane is an oncoming vehicle on a basis of the movement direction of the object and the movement direction of the another object, that the driving lane of the vehicle is on an outermost lane of a road having two lanes on each side.

6. The driving lane detection device according to claim 5, wherein
the object detector, in operation, calculates a Doppler frequency based on a difference between a frequency of the one or more reflection waves and a frequency of the radar signal transmitted by the radar device, and detects the movement direction of each of the one or more objects based on the Doppler frequency, and
the vehicle detector, in operation, determines that the one or more objects moving in a same direction as the vehicle is the parallel-running vehicle and that the one or more objects moving in an opposite direction as the vehicle is the oncoming vehicle.

7. A method for detecting a driving lane of a vehicle, the method comprising:
receiving one or more reflection waves that are a radar signal transmitted by a radar device and reflected by one or more objects;
generating object data that includes information relating to a distance from the vehicle to each of the one or more objects, a direction from the vehicle to each of the one or more objects, and a movement direction of each of the one or more objects based on the received one or more reflection waves;
detecting at least one of a parallel-running vehicle or an oncoming vehicle, based on the generated object data, the parallel-running vehicle being another vehicle that is running on a lane in a same direction as the vehicle, and the oncoming vehicle being another vehicle that is running on a lane in an opposite direction to the vehicle;
specifying a road on which the vehicle is running based on position data generated by a GPS positioning unit of the vehicle and map data accumulated in a data accumulator, and reading out lane information corresponding to the specified road from the data accumulator;
detecting a driving lane of the vehicle based on a distance from the vehicle to at least one of the detected parallel-running vehicle or the detected oncoming vehicle, a direction from the vehicle to at least one of the detected parallel-running vehicle or the detected oncoming vehicle, and the lane information, wherein
detecting the driving lane of the vehicle includes detecting, in response to determining that an object exists on an adjacent lane on a basis of the distance and direction from the vehicle to the object, and that the object is an oncoming vehicle on a basis of the movement direction of the object, that the driving lane of the vehicle is an innermost lane of a road having two lanes on each side,
detecting the driving lane of the vehicle further includes detecting, in response to determining that an object exists on an adjacent lane and another object exists on a lane adjacent to the adjacent lane on a basis of the distance and direction from the vehicle to the object and the distance and direction from the vehicle to the another object, and that the object that is running on the adjacent lane is a parallel-running vehicle and that the another object that is running on the lane adjacent to the adjacent lane is an oncoming vehicle on a basis of the movement direction of the object and the movement direction of the another object, that the driving lane of the vehicle is on an outermost lane of a road having two lanes on each side, and detecting the driving lane of the vehicle further includes detecting, in response to determining that an object exists on an adjacent lane and another object exists on a lane that is two lanes away from the adjacent lane on a basis of the distance and direction from the vehicle to the object and the distance and direction from the vehicle to the another object, and that the object that is running on the adjacent lane is a parallel-running vehicle and that the another object that is running two lanes away from the adjacent lane is an oncoming vehicle on a basis of the movement direction of the object and the movement direction of the another object, that the driving lane of the vehicle is on an outermost lane of a road having two lanes on each side.

8. The method according to claim 7, wherein the generating of the object data includes calculating a Doppler frequency based on a difference between a frequency of the received one or more reflection waves and a frequency of the radar signal transmitted by the radar device, and detecting the movement direction of each of the one or more objects based on the Doppler frequency, and the detecting of the at least one of the parallel-running vehicle or the oncoming vehicle includes determining that the one or more objects moving in a same direction as the vehicle is the parallel-running vehicle and that the one or more objects moving in an opposite direction as the vehicle is the oncoming vehicle.

* * * * *